(12) United States Patent
Tsuyama et al.

(10) Patent No.: US 11,622,054 B2
(45) Date of Patent: Apr. 4, 2023

(54) IMAGE READING APPARATUS AND METHOD FOR REPLACING CABLE

(71) Applicant: Seiko Epson Corporation, Tokyo (JP)

(72) Inventors: Kazuhiko Tsuyama, Kitakyushu (JP); Kazutoshi Nishida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/648,854

(22) Filed: Jan. 25, 2022

(65) Prior Publication Data
US 2022/0239792 A1 Jul. 28, 2022

(30) Foreign Application Priority Data
Jan. 28, 2021 (JP) .............................. JP2021-012117

(51) Int. Cl.
*G06F 3/12* (2006.01)
*H04N 1/00* (2006.01)

(52) U.S. Cl.
CPC ..... *H04N 1/00557* (2013.01); *H04N 1/00315* (2013.01); *H04N 1/00344* (2013.01); *H04N 1/00527* (2013.01)

(58) Field of Classification Search
CPC ........... H04N 1/00557; H04N 1/00551; H04N 1/00554; H04N 1/00315; H04N 1/00344; H04N 1/00527
See application file for complete search history.

(56) References Cited

U.S. PATENT DOCUMENTS

| 2011/0242618 | A1 | 10/2011 | Takeuchi et al. |
| 2014/0139889 | A1* | 5/2014 | Osakabe ............. H04N 1/1017 358/408 |
| 2018/0101344 | A1 | 4/2018 | Hishinuma et al. |
| 2018/0103166 | A1* | 4/2018 | Katayama .......... H04N 1/00018 |

FOREIGN PATENT DOCUMENTS

| JP | 2014-103455 | 6/2014 |
| JP | 2018-064140 | 4/2018 |

* cited by examiner

*Primary Examiner* — Moustapha Diaby
(74) *Attorney, Agent, or Firm* — Workman Nydegger (57) ABSTRACT

An upper unit configured to open and close an upper portion of a lower unit includes: a first reading unit disposed in a medium transport path, the first reading unit being configured to read a surface of a transported medium; a substrate coupled to the first reading unit; a cable having one end and another end, the one end being coupled to a first coupling portion of the first reading unit, the other end being coupled to a second coupling portion of the substrate; and a facing portion facing the lower unit in a state in which the upper unit is closed, the facing portion being configured to be attached to and detached from the upper unit. The cable is disposed at a position exposed when the facing portion is detached from the upper unit.

13 Claims, 12 Drawing Sheets

IMAGE READING APPARATUS AND METHOD FOR REPLACING CABLE

BACKGROUND

The present application is based on, and claims priority from JP Application Serial Number 2021-012117, filed Jan. 28, 2021, the disclosure of which is hereby incorporated by reference herein in its entirety.

TECHNICAL FIELD

The present disclosure relates to an image reading apparatus configured to read a medium surface. In addition, the present disclosure relates to a method for replacing a cable in an image reading apparatus.

RELATED ART

Some image reading apparatuses include, as an upper unit above a lower unit formed as a so-called flatbed scanner, a document transport unit for reading a document, which is an example of a medium, while transporting the document. JP-A-2014-103455 discloses an example of an image reading apparatus having such a configuration.

An image sensor disposed in the upper unit is coupled to a circuit substrate by a cable.

As described in JP-A-2014-103455, due to the layout, the circuit substrate and the portion where the cable is coupled to the image sensor may be disposed at respective positions that are separate from each other in the longitudinal direction of the image sensor, that is, in the width direction of a medium to be transported. In such a configuration, the cable extends in the width direction. Thus, when the image sensor and the cable are replaced together, for example, a frame forming the base of the apparatus has to be detached. This requires an extensive operation and a large amount of work time.

SUMMARY

To address the above issue, an image reading apparatus according to an aspect of the present disclosure includes a lower unit and an upper unit configured to open and close relative to the lower unit. The upper unit includes: a medium transport path along which a medium is transported; a first reading unit disposed in the medium transport path, the first reading unit being configured to read a surface of a transported medium; a substrate coupled to the first reading unit; a cable having one end and another end, the one end being coupled to a first coupling portion of the first reading unit, the other end being coupled to a second coupling portion of the substrate; and a facing portion facing the lower unit in a state in which the upper unit is closed, the facing portion being configured to be attached to and detached from the upper unit. The first coupling portion and the second coupling portion are disposed so as to be separate from each other in a width direction crossing a direction in which a medium is transported in the medium transport path. The cable is disposed at a position exposed when the facing portion is detached from the upper unit.

A method for replacing a cable according to an aspect of the present disclosure is a method for replacing a cable in an image reading apparatus, the apparatus including a lower unit and an upper unit configured to open and close an upper portion of the lower unit, in which the upper unit includes: a medium transport path along which a medium is transported; a first reading unit disposed in the medium transport path, the first reading unit being configured to read a surface of a transported medium; a substrate coupled to the first reading unit; the cable having one end and another end, the one end being coupled to a first coupling portion of the first reading unit, the other end being coupled to a second coupling portion of the substrate; and a facing portion facing the lower unit in a state in which the upper unit is closed, the facing portion being configured to be attached to and detached from the upper unit, and the first coupling portion and the second coupling portion are disposed so as to be separate from each other in a width direction crossing a direction in which a medium is transported in the medium transport path. The method includes: detaching the cable from the first coupling portion and the second coupling portion; detaching the facing portion from the upper unit in an open state; and detaching the cable from the upper unit.

DESCRIPTION OF EXEMPLARY EMBODIMENTS

The outline of the present disclosure will be described below.

An image reading apparatus according to a first aspect includes a lower unit and an upper unit configured to open and close relative to the lower unit. The upper unit includes: a medium transport path along which a medium is transported; a first reading unit disposed in the medium transport path, the first reading unit being configured to read a surface of a transported medium; a substrate coupled to the first reading unit; a cable having one end and another end, the one end being coupled to a first coupling portion of the first reading unit, the other end being coupled to a second coupling portion of the substrate; and a facing portion facing the lower unit in a state in which the upper unit is closed, the facing portion being configured to be attached to and detached from the upper unit. The first coupling portion and the second coupling portion are disposed so as to be separate from each other in a width direction crossing a direction in which a medium is transported in the medium transport path.

The cable is disposed at a position exposed when the facing portion is detached from the upper unit.

According to this aspect, since the cable is disposed at a position exposed when the facing portion is detached from the upper unit, it is possible to reduce work time for replacing the cable and to easily replace the cable in a shorter time.

According to a second aspect, in the first aspect, the lower unit includes a medium mounting portion facing the facing portion in the state in which the upper unit is closed, and a second reading unit positioned below the medium mounting portion, the second reading unit being configured to read a surface of a medium mounted on the medium mounting portion, and the facing portion holds the medium mounted on the medium mounting portion in the state in which the upper unit is closed.

According to this aspect, the configuration in which the facing portion holds the medium mounted on the medium mounting portion in the state in which the upper unit is closed enables the operational effect of the first aspect to be achieved.

According to a third aspect, in the second aspect, the facing portion includes a press member configured to press the medium mounted on the medium mounting portion in the state in which the upper unit is closed, and a cover member exposed when the press member is detached from the upper unit, and in a state in which the press member is detached from the upper unit and the cover member is attached to the upper unit, the cable is covered with the cover member.

The portion of the facing portion configured to press the medium mounted on the medium mounting portion while being in contact with the medium is likely to be worn. Thus, a user may replace this portion. In this case, when the cable is easily exposed, the user may carelessly come into contact with the cable and may cause malfunction.

However, according to this aspect, the facing portion includes the press member configured to press the medium mounted on the medium mounting portion in the state in which the upper unit is closed, and the cover member exposed when the press member is detached from the upper unit, and in the state in which the press member is detached from the upper unit and the cover member is attached to the upper unit, the cable is covered with the cover member. Thus, it is possible to avoid the above problem.

According to a fourth aspect, in any one of the first to third aspects, the cable is fixed to a cable fixing portion disposed at a frame forming a base of the upper unit.

According to this aspect, since the cable is fixed to the cable fixing portion disposed at the frame forming the base of the upper unit, the cable is unlikely to be vibrated. Thus, it is possible to reduce deterioration in communication quality.

According to a fifth aspect, in any one of the first to fourth aspects, the width direction is parallel to a depth direction of the apparatus, and in the width direction, the first coupling portion is positioned at a front of the apparatus, and the second coupling portion is positioned at a rear of the apparatus.

According to this aspect, since the width direction is parallel to the depth direction of the apparatus, and in the width direction, the first coupling portion is positioned at the front of the apparatus, and the second coupling portion is positioned at the rear of the apparatus, it is possible to dispose the substrate at the rear of the apparatus and to inhibit a user from carelessly coming into contact with the substrate.

According to a sixth aspect, in the fifth aspect, the first reading unit is configured to be inserted and extracted from the front of the apparatus.

According to this aspect, since the first reading unit is configured to be inserted and extracted from the front of the apparatus, this improves the ease of operation of replacing the first reading unit.

According to a seventh aspect, in any one of the first to sixth aspects, the upper unit includes a radio communication unit configured to perform radio communication with an external device, and the radio communication unit is disposed at a position exposed when the facing portion is detached from the upper unit.

According to this aspect, since the upper unit includes the radio communication unit configured to perform radio communication with the external device, and the radio communication unit is disposed at a position exposed when the facing portion is detached from the upper unit, such a configuration including the radio communication unit enables the radio communication unit to be easily accessed in a shorter time.

According to an eighth aspect, in any one of the first to seventh aspects, the upper unit includes a discharge tray to which a medium read by the first reading unit is discharged, the discharge tray includes an inclined portion on which a discharged medium is mounted in an inclined state, and the cable is routed between the inclined portion and the facing portion.

According to this aspect, since the cable is routed below the inclined portion of the discharge tray, it is possible to inhibit the size of the apparatus from increasing in the height direction due to routing of the cable.

A method for replacing a cable according to a ninth aspect is a method for replacing a cable in an image reading apparatus, the apparatus including a lower unit and an upper unit configured to open and close an upper portion of the lower unit, in which the upper unit includes: a medium transport path along which a medium is transported; a first reading unit disposed in the medium transport path, the first reading unit being configured to read a surface of a transported medium; a substrate coupled to the first reading unit; the cable having one end and another end, the one end being coupled to a first coupling portion of the first reading unit, the other end being coupled to a second coupling portion of the substrate; and a facing portion facing the lower unit in a state in which the upper unit is closed, the facing portion being configured to be attached to and detached from the upper unit, and the first coupling portion and the second coupling portion are disposed so as to be separate from each other in a width direction crossing a direction in which a medium is transported in the medium transport path. The method includes: detaching the cable from the first coupling portion and the second coupling portion; detaching the facing portion from the upper unit in an open state; and detaching the cable from the upper unit.

According to this aspect, it is possible to reduce work time for replacing the cable and to easily replace the cable in a shorter time.

The present disclosure will be specifically described below.

The X-Y-Z coordinate system illustrated in each figure is a rectangular coordinate system. The X-axis direction is the width direction of a medium to be transported in an apparatus and also the depth direction of the apparatus. In the present embodiment, the −X direction side is the front side of the apparatus, and the +X direction side is the rear side of the apparatus. In addition, the Y-axis direction is the width direction of the apparatus. The +Y direction side when the apparatus is viewed from the −X direction side is the left side. The −Y direction side when the apparatus is viewed from the −X direction side is the right side. The Z-axis direction is the height direction of the apparatus and the vertical direction.

Figure 1:
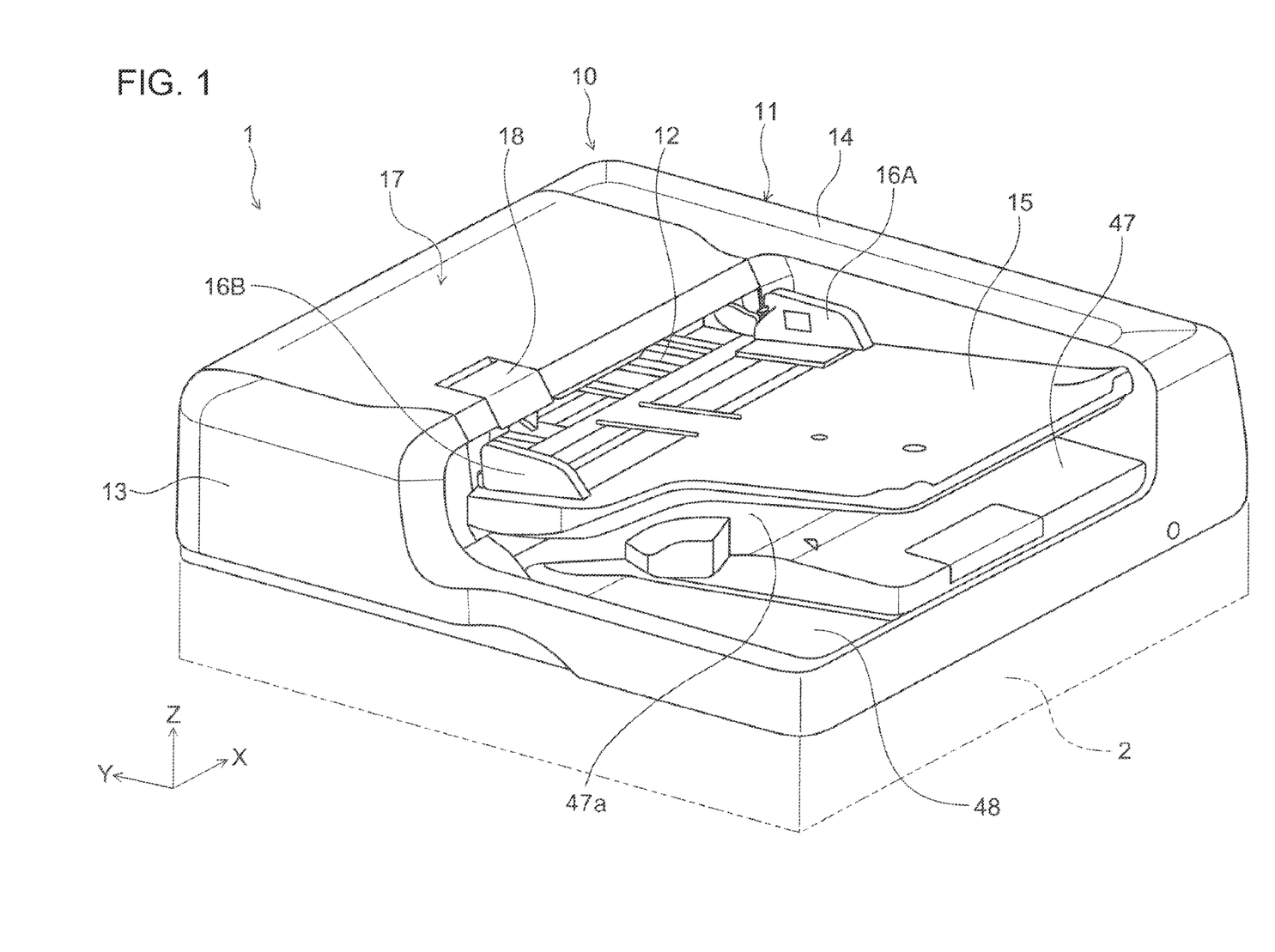
FIG. 1 is a top perspective external view of an upper unit.
Figure 2:
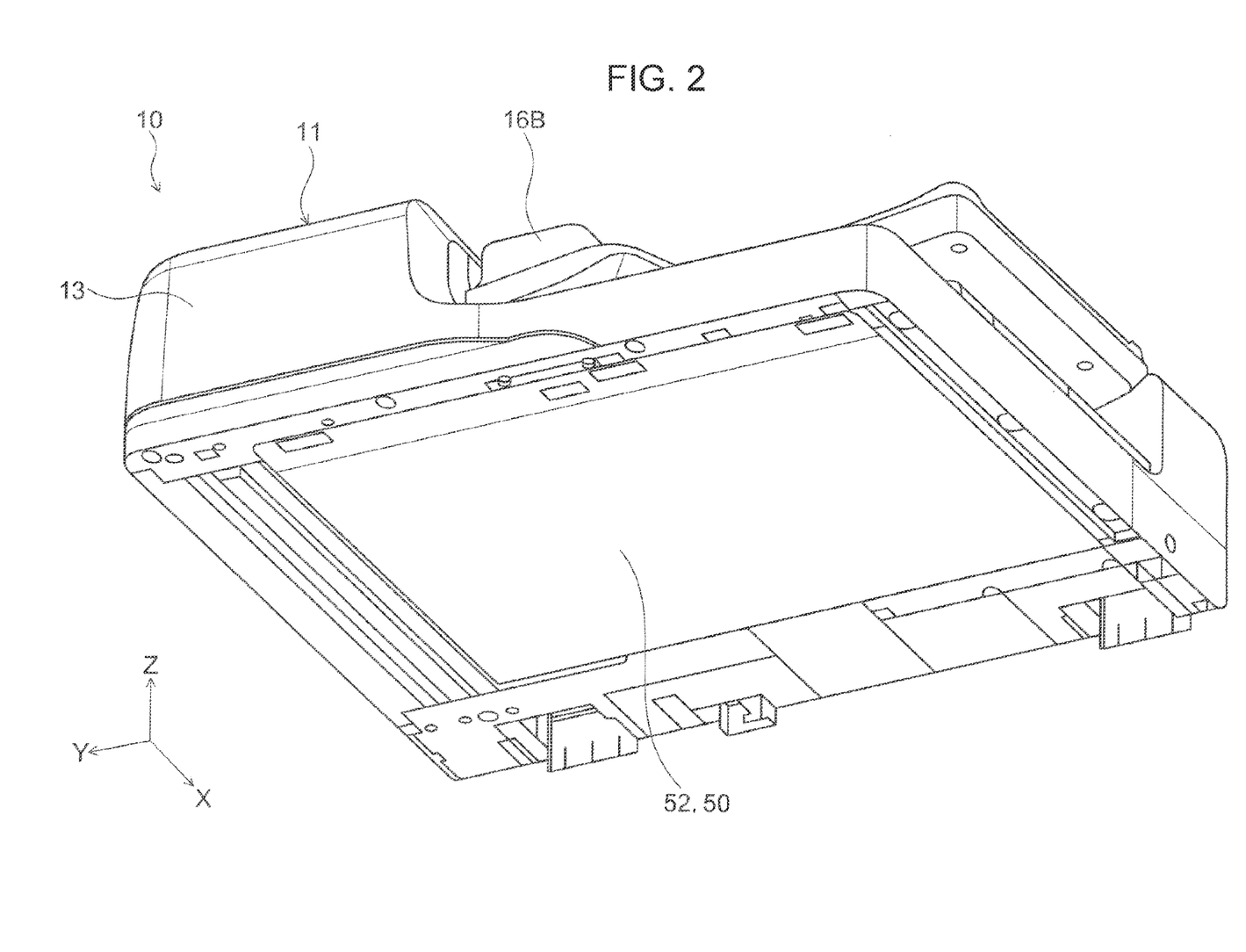
FIG. 2 is a bottom perspective external view of the upper unit.

In FIGS. 1 and 2, a scanner 1, which is an example of an image reading apparatus, includes an upper unit 10 above a lower unit 2, which is formed as a flatbed scanner. The upper unit 10 is disposed so as to be openable and closable relative to the lower unit 2 via a hinge (not illustrated) disposed at an end portion thereof in the +X direction. When the upper unit 10 opens or closes, a document glass 3 (see FIG. 3), which forms an upper portion of the lower unit 2, is opened or closed. The document glass 3 is an example of a medium mounting portion on which a medium is mounted.

The upper unit 10 includes an apparatus body 11, which includes a supply tray 15, an opening/closing cover 17, a first frame 12, and a discharge tray 47. The base of the apparatus body 11 is formed by the first frame 12 and a second frame 48. A front housing 13 is disposed on the −X direction side of the first frame 12 and the second frame 48. In addition, a rear housing 14 is disposed on the +X direction side of the first frame 12 and the second frame 48.

A medium yet to be supplied is mounted on the supply tray 15. An edge guide 16A, which is configured to guide the edge, in the +X direction, of a mounted medium, is disposed on the +X direction side of the supply tray 15. An edge guide 16B, which is configured to guide the edge, in the −X direction, of a mounted medium, is disposed on the −X direction side of the supply tray 15. The edge guides 16A and 16B are disposed so as to be slidable in respective directions in which the edge guides 16A and 16B approach or are separated from each other.

The opening/closing cover 17 is disposed so as to be rotatable around a rotation shaft (not illustrated) having a shaft axis parallel to the X-axis direction. An unlocking lever 18 is disposed at the opening/closing cover 17. When a user pulls up the unlocking lever 18, the user can unlock and open the opening/closing cover 17 in a completely closed state. When the opening/closing cover 17 is open, the inside of the upper unit 10 (in particular, a curved reverse path) is exposed, and it is thus possible to deal with a jam.

As illustrated in FIG. 2, a facing portion 50 is disposed on the side, facing the lower unit 2, of the upper unit 10. The facing portion 50 will be described later again.

Figure 3:
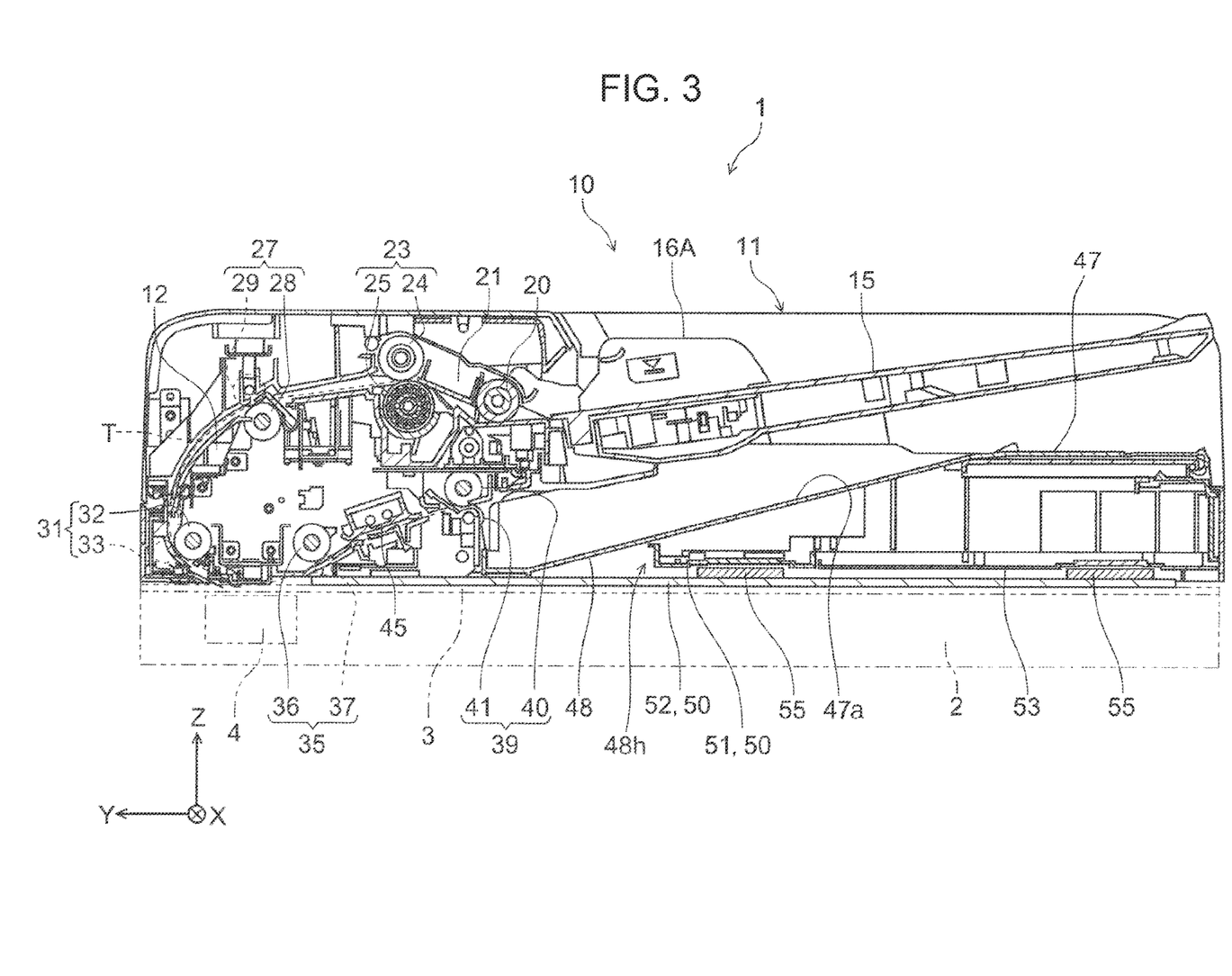
FIG. 3 illustrates a medium transport path in the upper unit.

As illustrated in FIG. 3, the lower unit 2 includes the document glass 3. A second reading unit 4 is disposed below the document glass 3 such that the second reading unit 4 is movable in the Y-axis direction.

A hold mat 52, which is configured to hold a medium mounted on the document glass 3, is disposed on the bottom of the upper unit 10 (see also FIG. 2). The hold mat 52 is not disposed in a region on the +Y direction side in the Y-axis direction. When a medium is transported toward the second reading unit 4 stopped in this region, the second reading unit 4 can read a surface of the medium. The upper unit 10 includes a first reading unit 45 therein. The first reading unit 45 and the second reading unit 4 can read respective surfaces of a transported medium.

A medium transport path in the upper unit 10 will be further described below with reference to FIG. 3.

In FIG. 3, a dashed line represented as a reference T represents the curved reverse path in the upper unit 10. The curved reverse path T is a path from a separating roller pair 23 to a discharge roller pair 39 described below.

A medium mounted on the supply tray 15 is sent by a pick roller 20. The pick roller 20 is disposed at a position facing an end region, in the +Y direction, of a medium mounted on the supply tray 15.

The pick roller 20, which is configured to be driven by a motor (not illustrated), is supported by a roller support member 21. The roller support member 21 is disposed so as to be rotatable around the same axis as a supply roller 24 described below. The roller support member 21 rotates to move the pick roller 20 forward or backward relative to a medium.

The separating roller pair 23 is disposed downstream of the pick roller 20. The separating roller pair 23 is formed by the supply roller 24, which is configured to be driven by a motor (not illustrated), and a separating roller 25, to which rotational resistance is applied. Rotational resistance is applied to the separating roller 25 by a torque limiter (not illustrated). A medium sent by the pick roller 20 is separated by an operation of the separating roller 25 and is sent downstream.

A first roller pair 27 is disposed downstream of the separating roller pair 23. The first roller pair 27 is formed by a drive roller 28, which is configured to be driven by a motor (not illustrated), and a driven roller 29, which is configured to be driven to rotate.

A medium is curved in a downward direction at a position downstream of the first roller pair 27. A second roller pair 31 is disposed downstream of the first roller pair 27. In the curved reverse path T, the second roller pair 31 nips and transports a medium at the position where the direction in which a surface of the medium faces changes from a downward direction to an upward direction, that is, at a position downstream of the position, closest to the +Y direction side, in the curved reverse path T.

The second roller pair 31 is formed by a drive roller 32, which is configured to be driven by a motor (not illustrated), and a driven roller 33, which is configured to be driven to rotate.

A medium sent from the supply tray 15 is reversed in the direction opposite to the direction in which the medium is sent from the supply tray 15, that is, in the −Y direction after being curved in a downward direction by the curved reverse path T. The reversed medium passes through a region facing the second reading unit 4 stopped at the position illustrated in FIG. 3 and is subjected to reading. The medium then reaches a third roller pair 35. The third roller pair 35 is formed by a drive roller 36, which is configured to be driven by a motor (not illustrated), and a driven roller 37, which is configured to be driven to rotate.

The medium sent by the third roller pair 35 passes through a region facing the first reading unit 45 and is subjected to reading. The medium then reaches the discharge roller pair 39. The discharge roller pair 39 is formed by a drive roller 40, which is configured to be driven by a motor (not illustrated), and a driven roller 41, which is configured to be driven to rotate. The medium is discharged to the discharge tray 47 by the discharge roller pair 39. The discharged medium is mounted in an inclined state on an inclined portion 47a of the discharge tray 47.

In the process of transporting a medium along the curved reverse path T described above, an upper surface of the medium that has been mounted on the supply tray 15 is read by the second reading unit 4, and a lower surface of the medium that has been mounted on the supply tray 15 is read by the first reading unit 45.

In the present embodiment, the first reading unit 45 and the second reading unit 4 are each formed by a contact image sensor module (CISM).

The CISM forming the first reading unit 45 and the CISM forming the second reading unit 4 are disposed such that the orientations thereof in the X-axis direction are opposite to each other by 180 degrees to coincide the pixel arrangement orders in the left-right direction of the reading surfaces thereof. This eliminates the need for image processing in which an image acquired by one of the first reading unit 45 and the second reading unit 4 is reversed. The pixel arrangement orders in the CISM forming the first reading unit 45 and the CISM forming the second reading unit 4 may differ from each other. In this case, the scanner 1 may perform processing for rotating one of the images read by the first reading unit 45 and the second reading unit 4 by 180 degrees.

Next, cable replacement in the upper unit 10 will be described.

Figure 4:
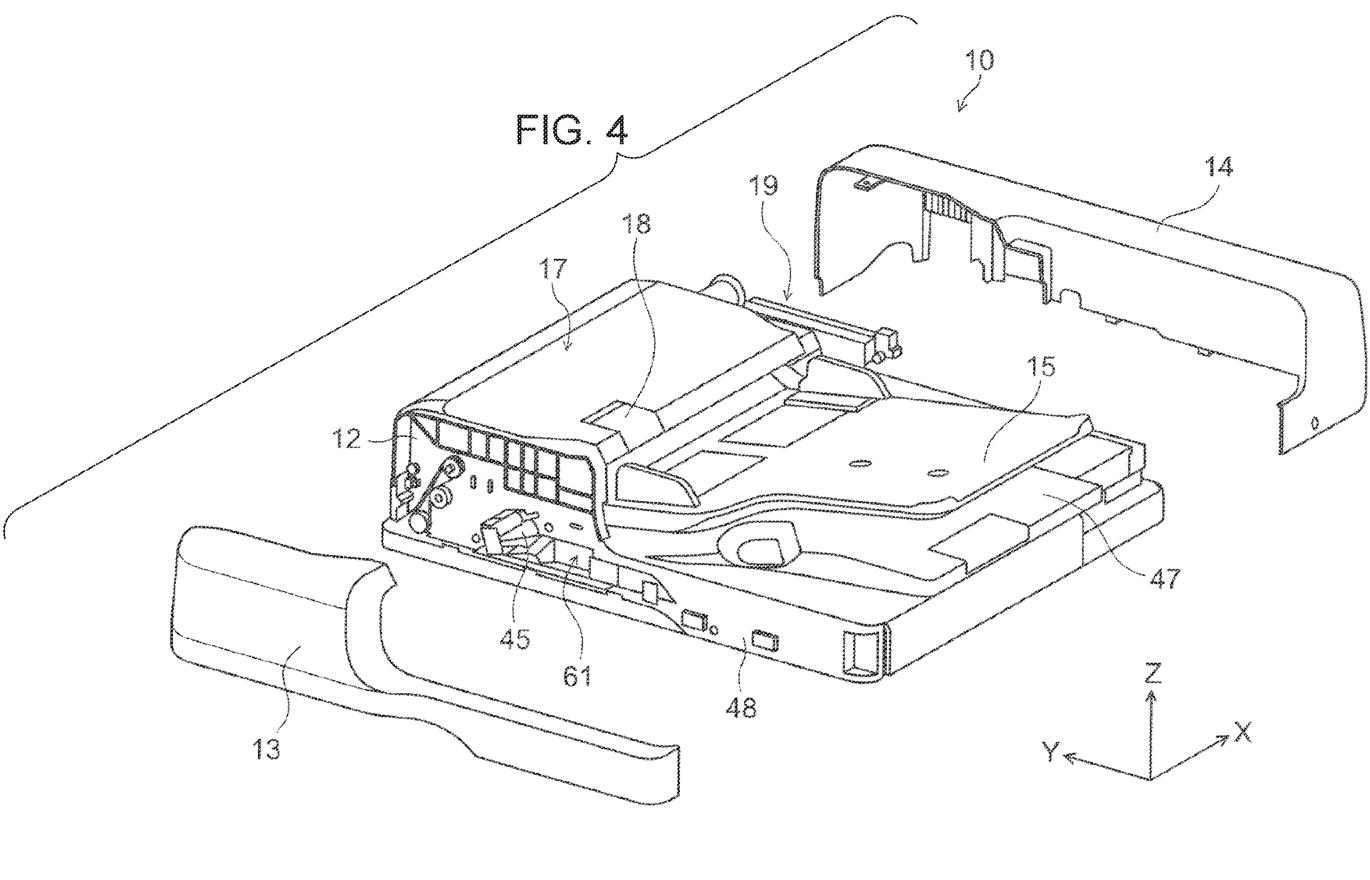
FIG. 4 is a perspective view of the upper unit from which a front housing and a rear housing are detached.

As illustrated in FIGS. 1, 2, and 4, the upper unit 10 includes the front housing 13 at the front of the apparatus and the rear housing 14 at the rear of the apparatus. The front housing 13 and the rear housing 14 are disposed so as to be detachably attached. As illustrated in FIG. 4, when the front housing 13 and the rear housing 14 are detached, the side surfaces on the −X direction side and the +X direction side of each of the first frame 12 and the second frame 48, which form the base of the upper unit 10, are exposed.

The first frame 12 and the second frame 48 form the curved reverse path T described above (see FIG. 3) and support each roller disposed in the curved reverse path T.

A drive mechanism 19 is disposed on the +X direction side of the first frame 12. The drive mechanism 19 drives each roller disposed in the curved reverse path T. The drive mechanism 19 is formed by including a motor and gears (not illustrated).

Figure 7:
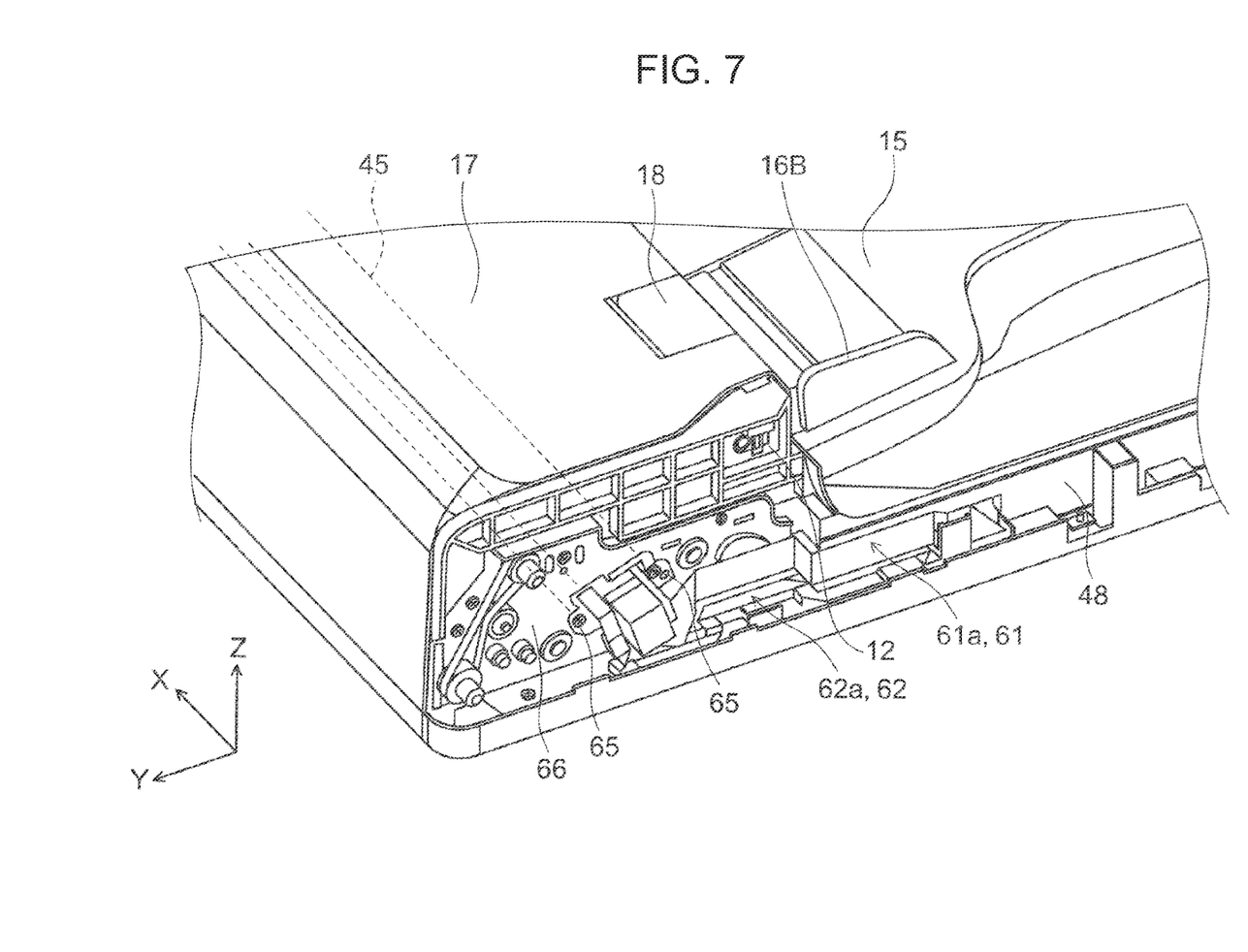
FIG. 7 is a perspective view of portions coupled to cables on the front side.

The first reading unit 45 is disposed in the first frame 12. When the front housing 13 is detached as illustrated in FIG. 4, the first reading unit 45 can be extracted in the −X direction, that is, toward the front side of the apparatus. Specifically, as illustrated in FIG. 7, the first reading unit 45 is fixed to the first frame 12 via a plate 66 with screws 65. Thus, when the screws 65 are removed, the first reading unit 45 can be extracted in the −X direction, that is, toward the front side of the apparatus. In addition, the extracted first reading unit 45 can be installed in the first frame 12 and fixed to the first frame 12 with the screws 65 by being inserted in the +X direction, that is, toward the rear side of the apparatus.

A first cable 61 and a second cable 62 are coupled to the first reading unit 45. A flat flexible cable (FFC) is usable as an example of the first cable 61 and the second cable 62.

Figure 8:
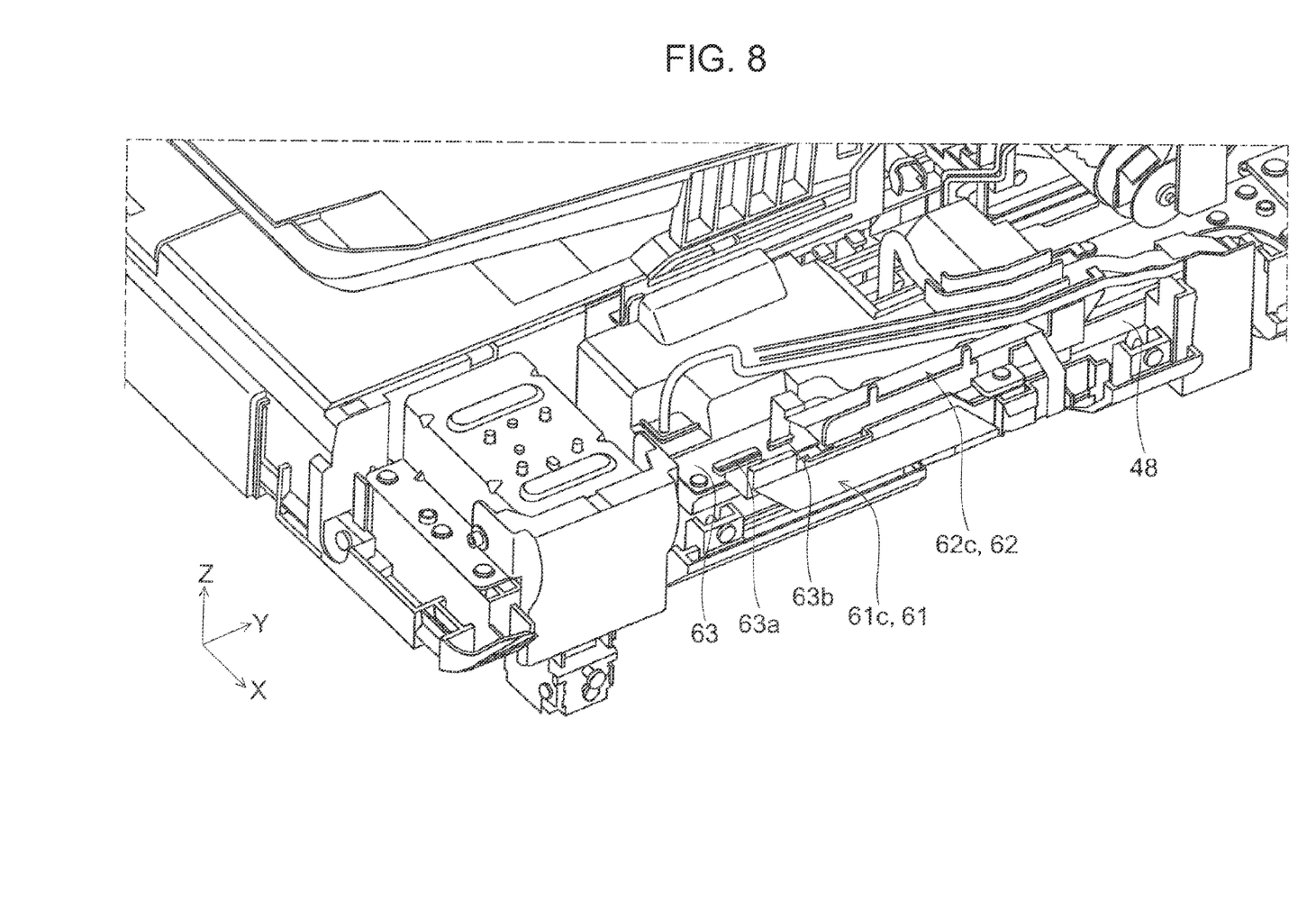
FIG. 8 is a perspective view of portions coupled to the cables on the rear side.

One end of each of the first cable 61 and the second cable 62 is coupled to the first reading unit 45 in the vicinity of the end portion thereof in the −X direction. As illustrated in FIG. 8, the other end of each of the first cable 61 and the second cable 62 is coupled to a circuit substrate 63, which is disposed at the end portion thereof in the +X direction.

Figure 9:
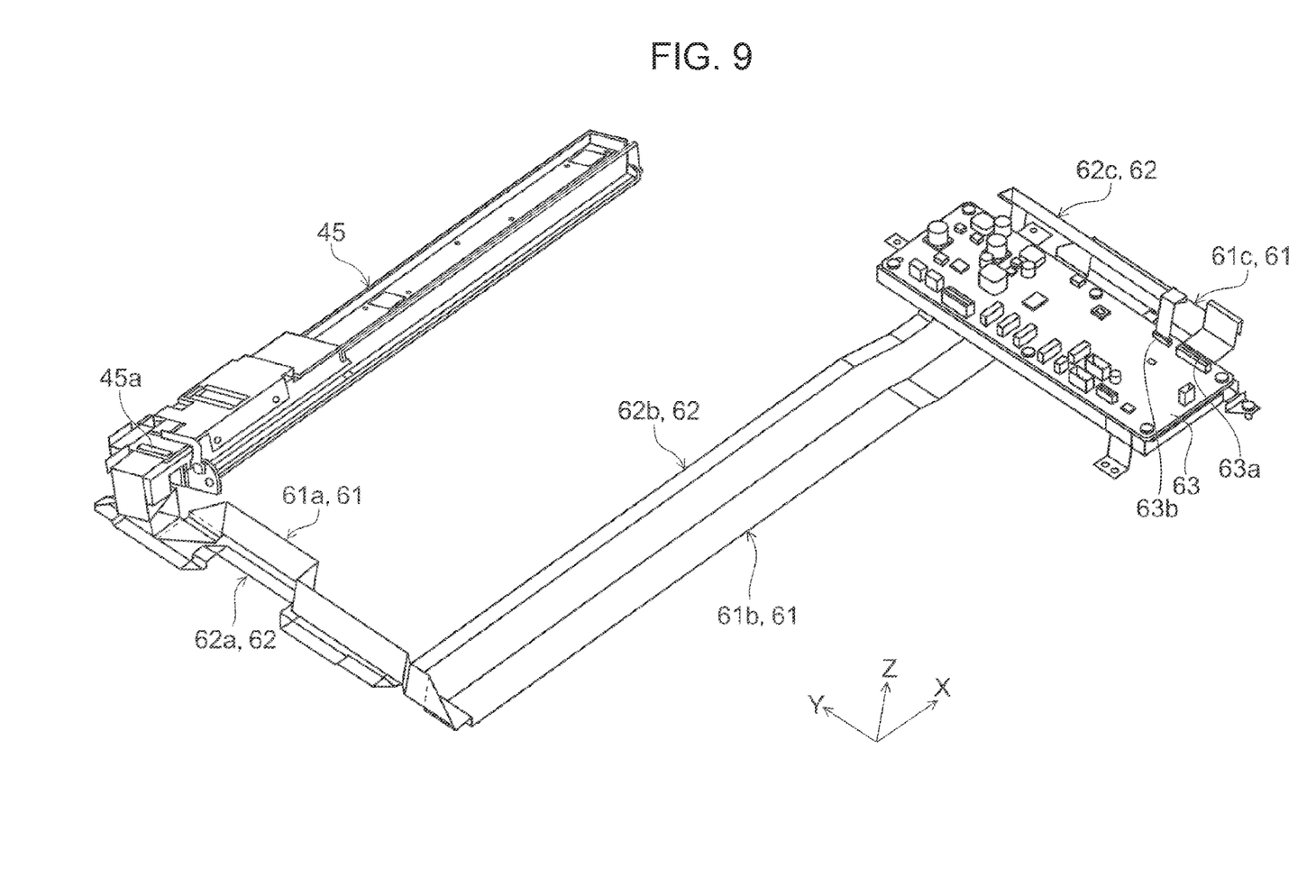
FIG. 9 is a perspective view of a first cable and a second cable disposed between a first reading unit and a circuit substrate.

FIG. 9 illustrates the first cable 61 and the second cable 62 disposed between the first reading unit 45 and the circuit substrate 63. As illustrated in FIG. 9, each end portion of the first cable 61 and the second cable 62 in the −X direction is routed in the Y-axis direction. A reference 61*a* represents the section of the first cable 61 routed in the Y-axis direction in the end portion in the −X direction. Hereinafter, this section is referred to as a first section 61*a* of the first cable 61. Similarly, a reference 62*a* represents the section of the second cable 62 routed in the Y-axis direction in the end portion in the −X direction. Hereinafter, this section is referred to as a first section 62*a* of the second cable 62.

As illustrated in FIG. 7, the first sections 61*a* and 62*a* are routed along the side surfaces on the −X direction side of the first frame 12 and the second frame 48.

Returning to FIG. 9, a reference 61*b* represents the section of the first cable 61 routed in the X-axis direction. Hereinafter, this section is referred to as a second section 61*b* of the first cable 61. Similarly, a reference 62*b* represents the section of the second cable 62 routed in the X-axis direction. Hereinafter, this section is referred to as a second section 62*b* of the second cable 62.

Figure 6:
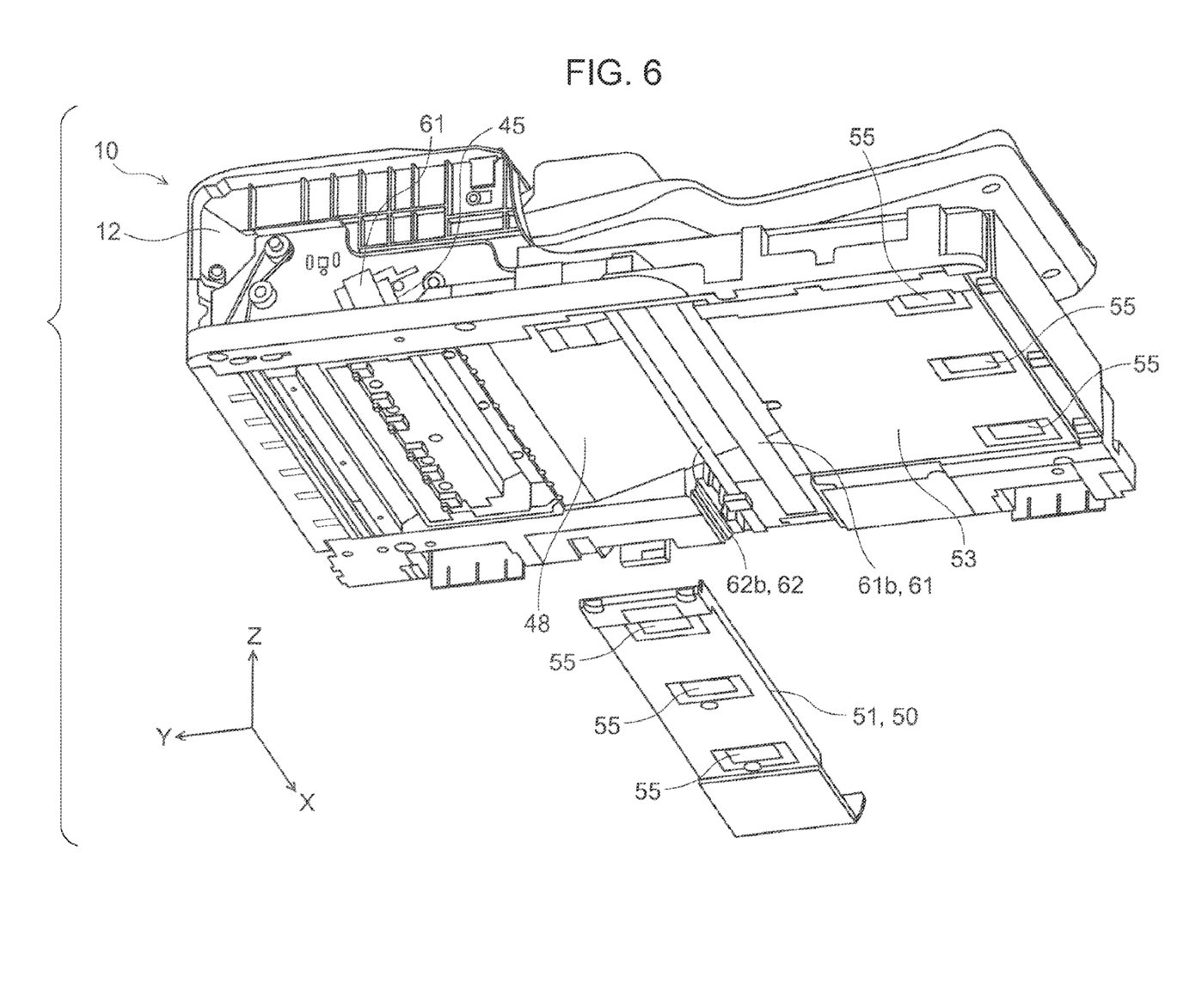
FIG. 6 is a perspective view of the upper unit from which a cover member is detached.

As illustrated in FIG. 6, the second sections 61*b* and 62*b* are routed in the X-axis direction below the second frame 48.

Returning to FIG. 9, a reference 61*c* represents the section of the first cable 61 routed in the Y-axis direction in the end portion in the +X direction. Hereinafter, this section is referred to as a third section 61*c* of the first cable 61. Similarly, a reference 62*c* represents the section of the second cable 62 routed in the Y-axis direction in the end portion in the +X direction. Hereinafter, this section is referred to as a third section 62*c* of the second cable 62.

As illustrated in FIG. 8, the third sections 61*c* and 62*c* are routed along the side surface on the +X direction side of the second frame 48.

Figure 10:
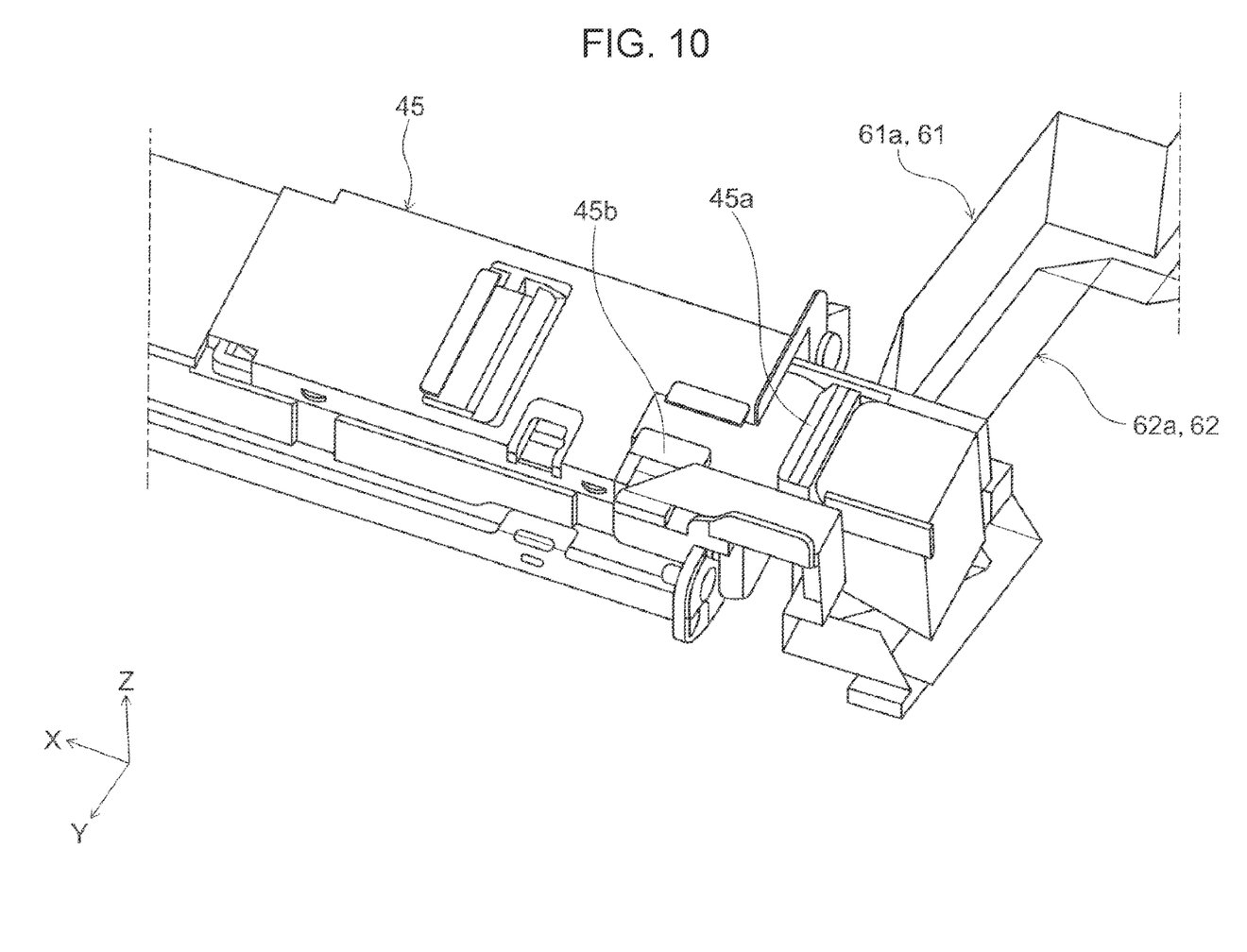
FIG. 10 is an enlarged perspective view of the portions, coupled to the cables, of the first reading unit.

As illustrated in FIG. 10, the first cable 61 is coupled to the first reading unit 45 at a first sensor coupling portion 45*a*. In addition, the second cable 62 is coupled to the first reading unit 45 at a second sensor coupling portion 45*b*. Each of the first sensor coupling portion 45*a* and the second sensor coupling portion 45*b* is an example of a first coupling portion, which is a portion where the one end of each of the first cable 61 and the second cable 62 is coupled to the first reading unit 45. In the present embodiment, each of the first sensor coupling portion 45*a* and the second sensor coupling portion 45*b* is formed by a connector for coupling a flat flexible cable.

As illustrated in FIG. 9, the first cable 61 is coupled to the circuit substrate 63 at a first substrate coupling portion 63*a*. In addition, the second cable 62 is coupled to the circuit substrate 63 at a second substrate coupling portion 63*b*. Each of the first substrate coupling portion 63*a* and the second substrate coupling portion 63*b* is an example of a second coupling portion, which is a portion where the other end of each of the first cable 61 and the second cable 62 is coupled to the circuit substrate 63. In the present embodiment, each of the first substrate coupling portion 63*a* and the second substrate coupling portion 63*b* is formed by a connector for coupling a flat flexible cable.

As illustrated in FIG. 9, the first sensor coupling portion 45*a* and the second sensor coupling portion 45*b*, each of which is an example of the first coupling portion, and the first substrate coupling portion 63*a* and the second substrate coupling portion 63*b*, each of which is an example of the second coupling portion, are disposed so as to be separate from each other in the X-axis direction, that is, in the width direction crossing the direction in which a medium is transported in the curved reverse path T. With this configuration, the length of each of the second sections 61*b* and 62*b* in the X-axis direction is larger than the length of the first reading unit 45 in the X-axis direction.

Figure 5:
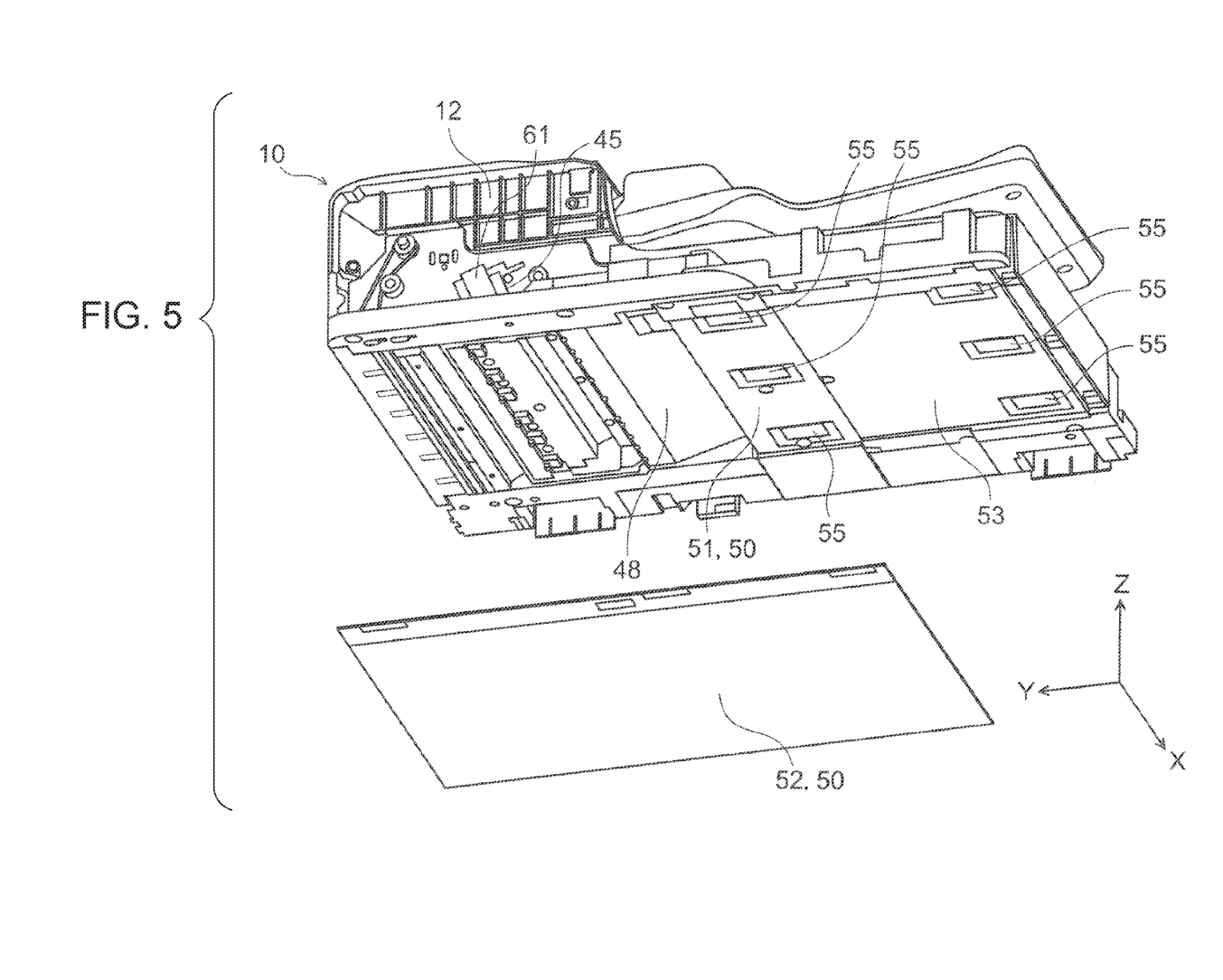
FIG. 5 is a perspective view of the upper unit from which a hold mat is detached.

Next, as illustrated in FIGS. 2 and 5, the facing portion 50 is disposed on the bottom of the upper unit 10. In the present embodiment, the facing portion 50 is formed by a cover member 51 and the hold mat 52. As illustrated in FIG. 3, in a state in which the upper unit 10 is closed, the facing portion 50 faces the document glass 3 of the lower unit 2 and presses a medium mounted on the document glass 3 against the document glass 3.

The facing portion 50 is disposed so as to be detachably attached to the upper unit 10. More specifically, as illustrated in FIG. 5, a hold member 53 is disposed on the −Y direction side of the cover member 51. The cover member 51 and the hold member 53 are formed so as to be substantially flush with each other. A plurality of hook-and-loop fasteners 55 are disposed on the cover member 51 and the hold member 53. The hook-and-loop fastener 55 is an example of a fixing unit with which the hold mat 52 is fixed to the cover member 51 or the hold member 53.

As illustrated in FIG. 5, when the hold mat 52 is detached, the cover member 51 and the hold member 53 are exposed. The hold member 53 is disposed so as to be fixed to the second frame 48. The cover member 51 is disposed so as to be detachably attached to the second frame 48. The cover member 51 is fixed to the second frame 48 with screws (not illustrated).

As illustrated in FIG. 6, when the cover member 51 is detached, the second section 61b of the first cable 61 and the second section 62b of the second cable 62 are exposed.

Figure 12:
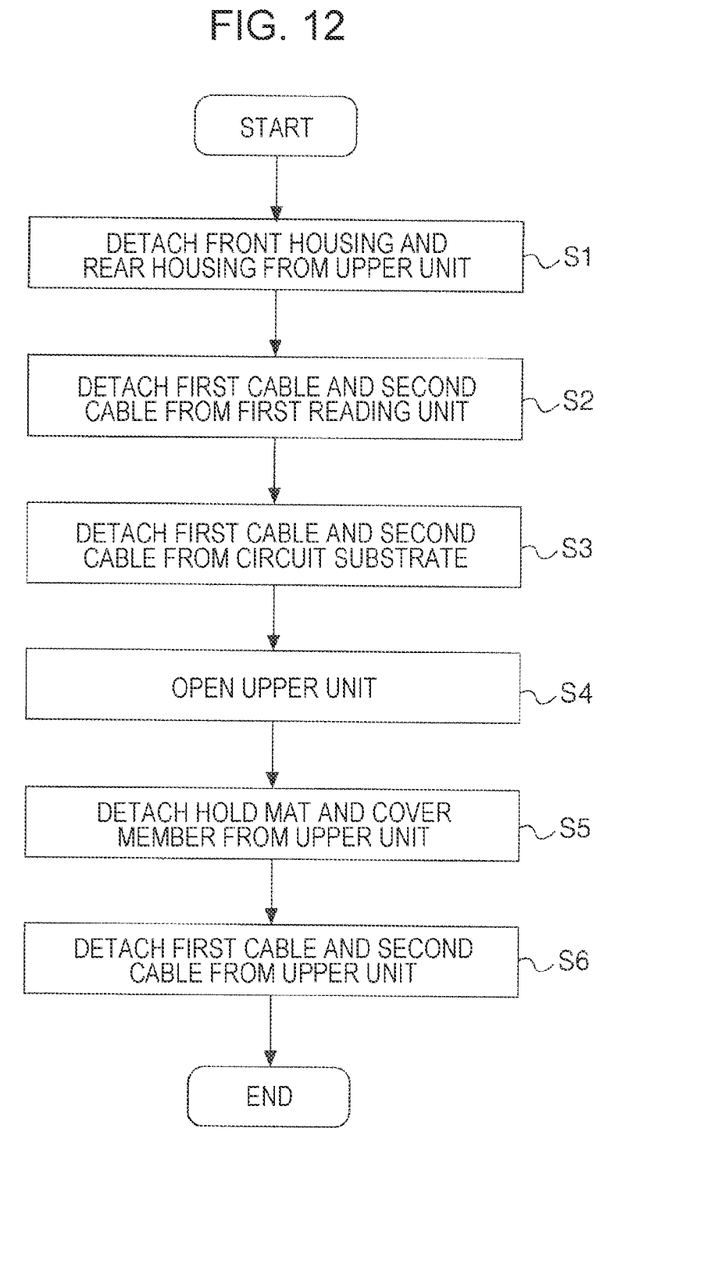
FIG. 12 is a flowchart of a process of detaching the first cable and the second cable.

In the above configuration, when the first reading unit 45, the first cable 61, and the second cable 62 have to be replaced, the following process is performed. FIG. 12 particularly illustrates a process of detaching the first cable 61 and the second cable 62 out of processes of replacing the first reading unit 45, the first cable 61, and the second cable 62. First, as illustrated in FIG. 4, in the state in which the upper unit 10 is closed, the front housing 13 and the rear housing 14 are detached from the upper unit 10 (step S1). Subsequently, the first cable 61 and the second cable 62 are detached from the first reading unit 45 (step S2).

When the first cable 61 and the second cable 62 are detached from the first reading unit 45, the screws 65, which have been described with reference to FIG. 7, are removed, and the first reading unit 45 is slightly drawn in the −X direction. As a result, the second sensor coupling portion 45b, which is illustrated in FIG. 10, is exposed to the outside of the first frame 12. The first sensor coupling portion 45a is always exposed to the outside of the first frame 12.

Subsequently, the first cable 61 and the second cable 62 are detached from the circuit substrate 63 (step S3). As illustrated in FIG. 8, the first substrate coupling portion 63a and the second substrate coupling portion 63b of the circuit substrate 63 are always exposed to the outside of the second frame 48. Thus, it is possible to detach the first cable 61 from the first substrate coupling portion 63a and to detach the second cable 62 from the second substrate coupling portion 63b without detaching the circuit substrate 63 from the second frame 48.

Subsequently, the upper unit 10 is opened (step S4). Then, the hold mat 52 and the cover member 51 are detached from the upper unit 10 in this order (step S5). Then, the first cable 61 and the second cable 62 are detached from the upper unit 10 (step S6).

After the first cable 61 and the second cable 62 are detached, a new first cable 61 and a new second cable 62 are routed, and a new first reading unit 45 is inserted. After one end of each of the first cable 61 and the second cable 62 is coupled to the first reading unit 45, the first reading unit 45 is fixed. In addition, the other end of each of the first cable 61 and the second cable 62 is coupled to the circuit substrate 63.

The upper unit 10 may be opened (step S4) prior to one of the steps S1 to S3.

As described above, the cable replacement method in the upper unit 10 includes the process of detaching the first cable 61 and the second cable 62 from the first reading unit 45 and the circuit substrate 63 (steps S2 and S3), the process of opening the upper unit 10 in the closed state and detaching the facing portion 50 from the upper unit 10 (steps S4 and S5), and the process of detaching, from the upper unit 10, the first cable 61 and the second cable 62 exposed by detaching the facing portion 50 (step S6).

Figure 11:
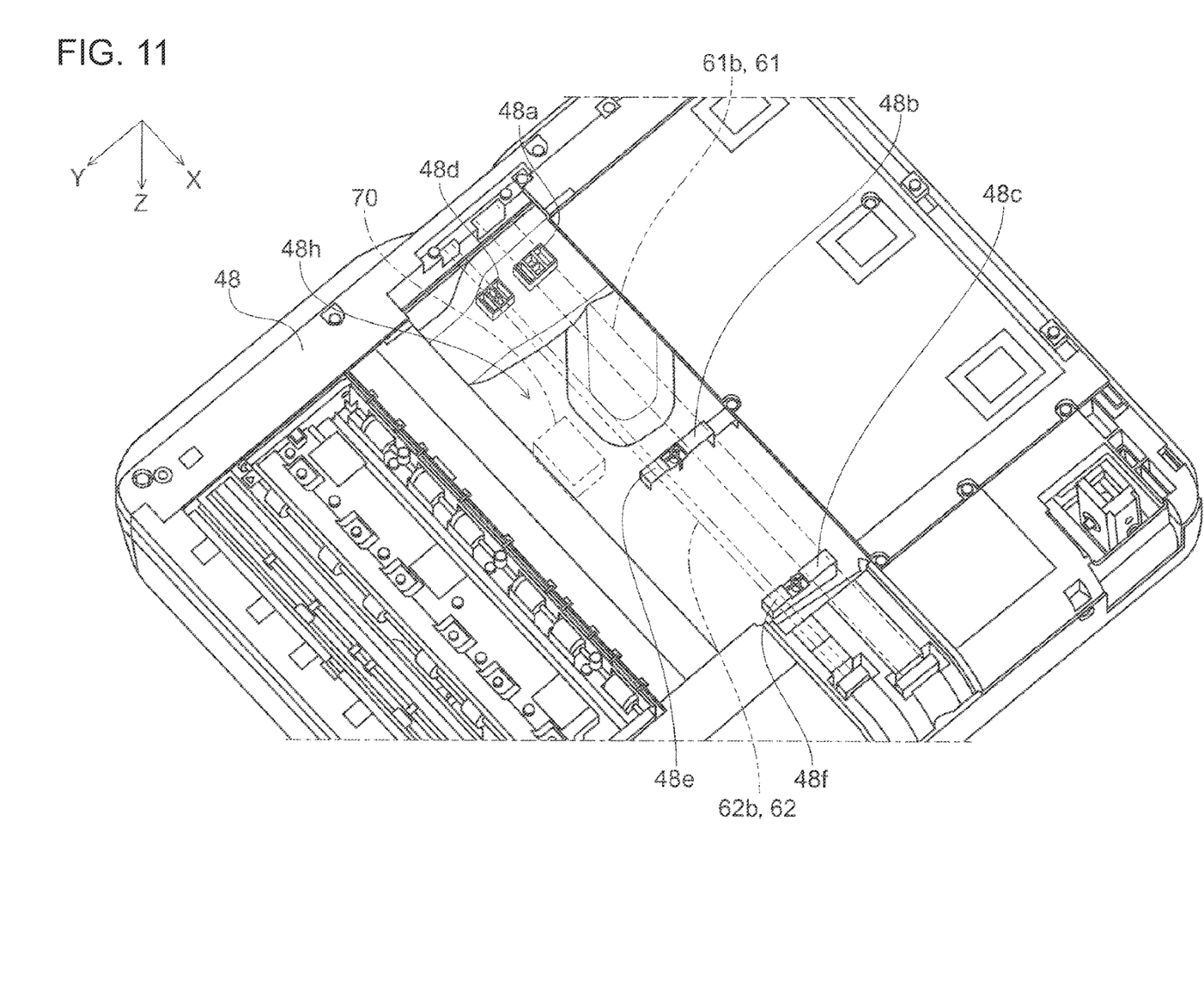
FIG. 11 is a perspective view of cable fixing portions disposed at a second frame.

As illustrated in FIG. 11, the first cable 61 is fixed to cable fixing portions 48a, 48b, and 48c, which are formed at the second frame 48, with double-sided adhesive tape (not illustrated). Similarly, the second cable 62 is fixed to cable fixing portions 48d, 48e, and 48f, which are formed at the second frame 48, with double-sided adhesive tape (not illustrated). Such double-sided adhesive tape is an example of a fixing unit with which the first cable 61 and the second cable 62 are fixed to the second frame 48.

The cable fixing portions 48a, 48b, 48c, 48d, 48e, and 48f are formed in a space 48h, which is formed below the second frame 48. As illustrated in FIG. 3, the space 48h is a space formed below the discharge tray 47, which has an inclined shape. The first cable 61 and the second cable 62 are routed by effectively using this space.

As described above, in the upper unit 10, the first cable 61 and the second cable 62 are disposed at respective positions exposed by detaching the facing portion 50. This enables a reduction in work time for replacing the first cable 61 and the second cable 62 and enables the first cable 61 and the second cable 62 to be easily replaced in a shorter time.

In the present embodiment, two cables, that is, the first cable 61 and the second cable 62, are used. However, the number of such cables to be used may be one or three or more.

In addition, the facing portion 50 includes the hold mat 52, which is a press member configured to press a medium mounted on the document glass 3 while being in contact with the medium in the state in which the upper unit 10 is closed, and the cover member 51, which is exposed when the hold mat 52 is detached. In the state in which the hold mat 52 is detached from the upper unit 10 and the cover member 51 is attached to the upper unit 10, the first cable 61 and the second cable 62 are covered with the cover member 51. With this configuration, it is possible to inhibit a user from carelessly coming into contact with the first cable 61 and the second cable 62 and from causing malfunction because the first cable 61 and the second cable 62 are covered with the cover member 51 even when the user detaches the hold mat 52 to replace the hold mat 52.

In addition, the first cable 61 and the second cable 62 are fixed to the cable fixing portions 48a, 48b, 48c, 48d, 48e, and 48f, which are disposed at the second frame 48, which forms the base of the upper unit 10. With this configuration, it is possible to reduce deterioration in communication quality because the first cable 61 and the second cable 62 are unlikely to be vibrated.

In the state in which the first cable 61 and the second cable 62 are fixed, a certain space is formed between the cover member 51 and each of the first cable 61 and the second cable 62.

In addition, the X-axis direction, that is, the width direction that is a direction crossing the curved reverse path T, is parallel to the depth direction of the apparatus. In the width direction, the first sensor coupling portion 45a and the second sensor coupling portion 45b, each of which is an example of the first coupling portion, are positioned at the front of the apparatus, and the first substrate coupling portion 63a and the second substrate coupling portion 63b, each of which is an example of the second coupling portion, are positioned at the rear of the apparatus. With this configuration, it is possible to dispose the circuit substrate 63 at the rear of the apparatus and to inhibit a user from carelessly coming into contact with the circuit substrate 63.

In addition, the first reading unit 45 is configured to be inserted and extracted from the front of the apparatus. Thus, this improves the ease of operation of replacing the first reading unit 45.

As illustrated in FIG. 11, a radio communication unit 70, which is configured to perform radio communication with the outside of the apparatus, may be disposed at a position exposed when the facing portion 50 is detached, that is, in the space 48h of the second frame 48. With such a configuration, it is possible to easily access the radio communication unit 70 in a shorter time. The radio communication unit 70 is, for example, a non-contact IC card reader. When a user holds an IC card over the radio communication unit 70, the radio communication unit 70 can read information in the IC card.

In addition, the first cable 61 and the second cable 62 are routed between the facing portion 50 and the inclined portion 47a of the discharge tray 47, that is, below the inclined portion 47a of the discharge tray 47. Thus, it is possible to inhibit the size of the apparatus from increasing in the height direction due to routing of the first cable 61 and the second cable 62.

Preferably, an electromagnetic shielding sheet material or an electromagnetic shielding plate material is disposed inside the cover member 51. With this configuration, it is possible to reduce deterioration in the quality of communication using the first cable 61 and the second cable 62.

Furthermore, the present disclosure is not limited to each embodiment described above. Various modifications can be made without departing from the scope of the claims. It is needless to say that such modifications are also encompassed within the scope of the present disclosure.

What is claimed is:

1. An image reading apparatus comprising:
a lower unit; and
an upper unit configured to open and close relative to the lower unit, wherein
the upper unit includes
a medium transport path along which a medium is transported,
a first reading unit disposed in the medium transport path, the first reading unit being configured to read a surface of a transported medium,
a substrate coupled to the first reading unit,
a cable having one end and another end, the one end being coupled to a first coupling portion of the first reading unit, the other end being coupled to a second coupling portion of the substrate, and
a facing portion facing the lower unit in a state in which the upper unit is closed, the facing portion being configured to be attached to and detached from the upper unit,
the first coupling portion and the second coupling portion are disposed so as to be separate from each other in a width direction crossing a direction in which a medium is transported in the medium transport path, and
the cable is disposed at a position exposed when the facing portion is detached from the upper unit.

2. The image reading apparatus according to claim 1, wherein
the lower unit includes
a medium mounting portion facing the facing portion in the state in which the upper unit is closed, and
a second reading unit positioned below the medium mounting portion, the second reading unit being configured to read a surface of a medium mounted on the medium mounting portion, and
the facing portion holds the medium mounted on the medium mounting portion in the state in which the upper unit is closed.

3. The image reading apparatus according to claim 2, wherein
the facing portion includes
a press member configured to press the medium mounted on the medium mounting portion in the state in which the upper unit is closed, and
a cover member exposed when the press member is detached from the upper unit, and
in a state in which the press member is detached from the upper unit and the cover member is attached to the upper unit, the cable is covered with the cover member.

4. The image reading apparatus according to claim 3, wherein
the cable is fixed to a cable fixing portion disposed at a frame forming a base of the upper unit.

5. The image reading apparatus according to claim 4, wherein
the width direction is parallel to a depth direction of the apparatus, and
in the width direction, the first coupling portion is positioned at a front of the apparatus, and the second coupling portion is positioned at a rear of the apparatus.

6. The image reading apparatus according to claim 5, wherein
the first reading unit is configured to be inserted and extracted from the front of the apparatus.

7. The image reading apparatus according to claim 6, wherein
the upper unit includes a discharge tray to which a medium read by the first reading unit is discharged,
the discharge tray includes an inclined portion on which a discharged medium is mounted in an inclined state, and
the cable is routed between the inclined portion and the facing portion.

8. The image reading apparatus according to claim 1, wherein
the cable is fixed to a cable fixing portion disposed at a frame forming a base of the upper unit.

9. The image reading apparatus according to claim 1, wherein
the width direction is parallel to a depth direction of the apparatus, and
in the width direction, the first coupling portion is positioned at a front of the apparatus, and the second coupling portion is positioned at a rear of the apparatus.

10. The image reading apparatus according to claim 9, wherein
the first reading unit is configured to be inserted and extracted from the front of the apparatus.

11. The image reading apparatus according to claim 1, wherein
the upper unit includes a radio communication unit configured to perform radio communication with an external device, and the radio communication unit is disposed at a position exposed when the facing portion is detached from the upper unit.

12. The image reading apparatus according to claim 1, wherein
the upper unit includes a discharge tray to which a medium read by the first reading unit is discharged,
the discharge tray includes an inclined portion on which a discharged medium is mounted in an inclined state, and
the cable is routed between the inclined portion and the facing portion.

13. A method for replacing a cable in an image reading apparatus,
the apparatus including
a lower unit, and
an upper unit configured to open and close an upper portion of the lower unit, in which
the upper unit includes
a medium transport path along which a medium is transported,
a first reading unit disposed in the medium transport path, the first reading unit being configured to read a surface of a transported medium,
a substrate coupled to the first reading unit,
the cable having one end and another end, the one end being coupled to a first coupling portion of the first reading unit, the other end being coupled to a second coupling portion of the substrate, and
a facing portion facing the lower unit in a state in which the upper unit is closed, the facing portion being configured to be attached to and detached from the upper unit, and
the first coupling portion and the second coupling portion are disposed so as to be separate from each other in a width direction crossing a direction in which a medium is transported in the medium transport path, the method comprising:
detaching the cable from the first coupling portion and the second coupling portion;
detaching the facing portion from the upper unit in an open state; and
detaching the cable from the upper unit.

* * * * *